No. 637,511. Patented Nov. 21, 1899.
F., R. & O. KAMPFE.
SAFETY RAZOR.
(Application filed May 4, 1898.)
(No Model.) 3 Sheets—Sheet 1.
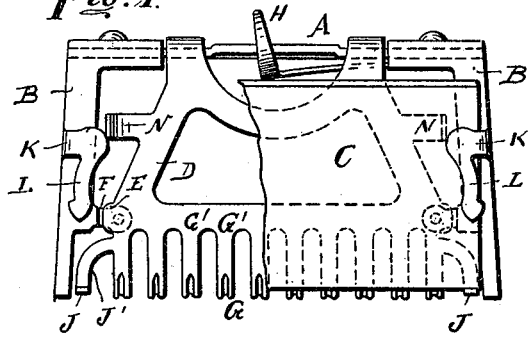
Fig: 1.
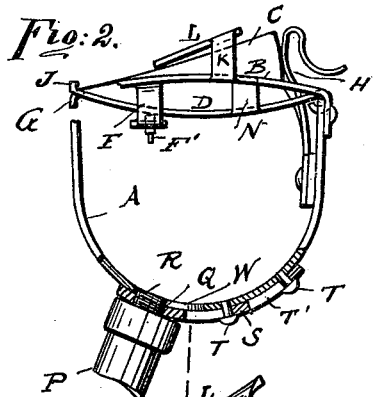
Fig: 2.
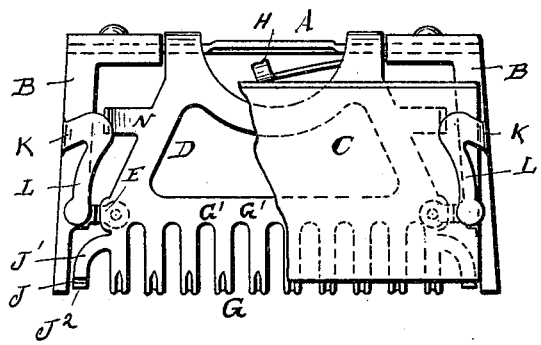
Fig: 3.
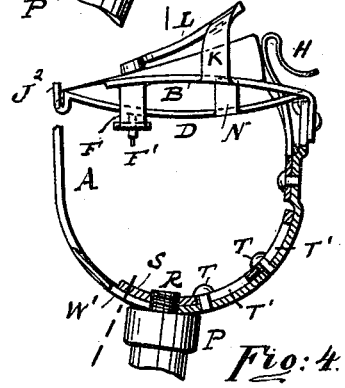
Fig: 4.
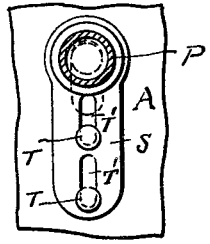
Fig: 5.
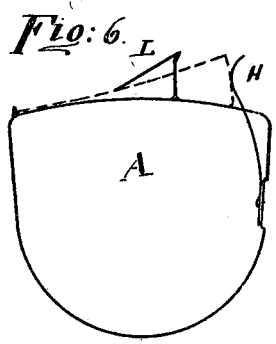
Fig: 6.
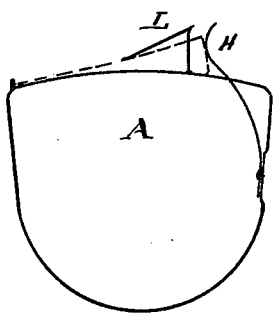
Fig: 7.
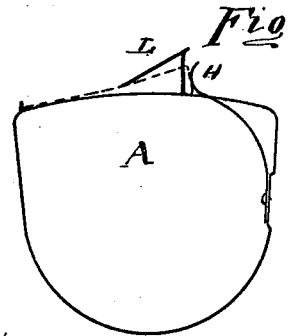
Fig: 8.
Witnesses
Peter Albertiness.
H. M. Flannery
Inventors
F. Kampfe
R. Kampfe
O. Kampfe
By their Attorney
Oscar F. Trunz
THE NORRIS PETERS CO., PHOTO-LITHO., WASHINGTON, D. C.

No. 637,511. Patented Nov. 21, 1899.
F., R. & O. KAMPFE.
SAFETY RAZOR.
(Application filed May 4, 1898.)
(No Model.) 3 Sheets—Sheet 2.
Fig. 9.
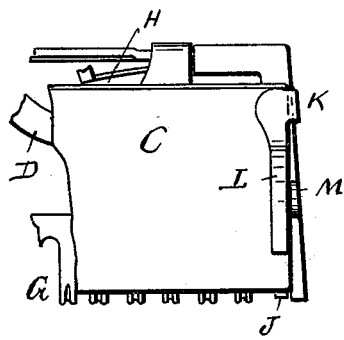
Fig. 10.
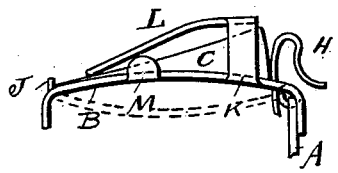
Fig. 11.
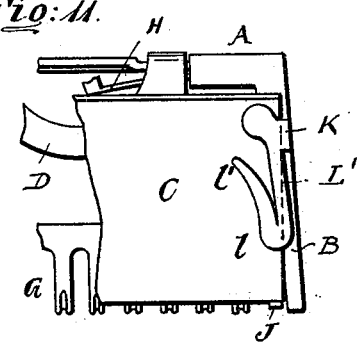
Fig. 12.
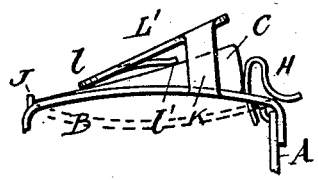
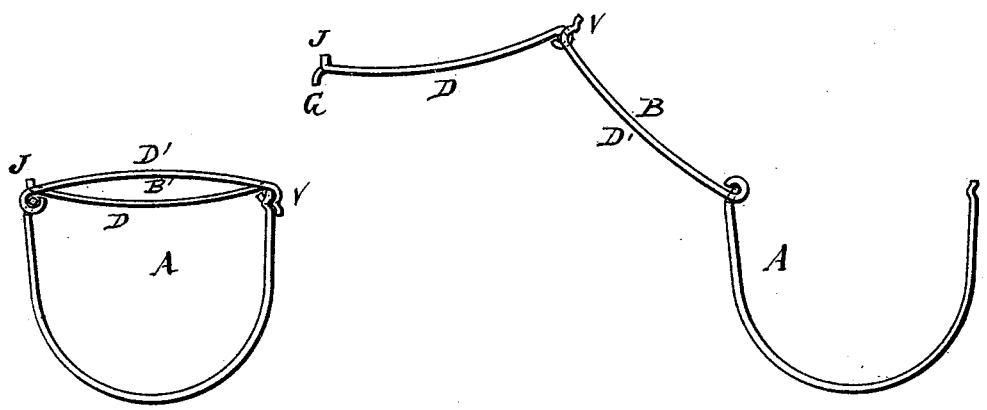
Fig. 13. Fig. 14.
Witnesses
Peter Albertine
H. M. Flannery
F. Kampfe
R. Kampfe
O. Kampfe
Inventors
By their Attorney
Scott Lunn No. 637,511. Patented Nov. 21, 1899.
F., R. & O. KAMPFE.
SAFETY RAZOR.
(Application filed May 4, 1898.)

(No Model.) 3 Sheets—Sheet 3.

Witnesses
Peter Albertine Jr.
H. M. Flannery

F. Kampfe
R. Kampfe   Inventors
O. Kampfe
By their Attorney
Oscar F. Gunz

UNITED STATES PATENT OFFICE.

FREDERICK KAMPFE, RICHARD KAMPFE, AND OTTO KAMPFE, OF NEW YORK, N. Y.

SAFETY-RAZOR.

SPECIFICATION forming part of Letters Patent No. 637,511, dated November 21, 1899.

Application filed May 4, 1898. Serial No. 679,671. (No model.)

*To all whom it may concern:*

Be it known that we, FREDERICK KAMPFE, RICHARD KAMPFE, and OTTO KAMPFE, citizens of the United States, and residents of the city of New York, borough of Brooklyn, county of Kings, State of New York, have invented certain new and useful Improvements in Safety-Razors, of which the following is a specification.

This invention relates to safety-razors.

In our experience of many years we have found that the blades for safety-razors do not all have the same concavity, for as the grindstones wear off the concavity of the blades produced gradually increases, and each blade of different concavity requires a readjustment of the blade-holder—that is, the blade-holder must be so adjusted that the cutting edge of the blade is absolutely in the correct position in relation to the guard, and this requires much time and is expensive; but even if the blades are all alike each holder must be adjusted, which does not require as much time and labor as when the blades are of different concavity or width. We have also found that as blades are reground after they have been used a number of years or because they have become nicked they decrease in width and thus require a readjustment of the holder, and where a number of blades go with one holder such adjustment for all blades is frequently impossible and necessitates the discarding of all the blades. We have also found that it is desirable to have the top of the holder open up entirely, so as to facilitate cleaning, and that it is desirable in many cases to have the handle of the holder adjustable in regard to its inclination to the holder.

The object of our invention is to provide a new and improved safety-razor in which the holder is adapted to receive and hold any blade of greater or less width or concavity and in which the blade without adjustment is held in such a manner that the cutting edge is in the correct position for good shaving.

A further object of our invention is to provide a blade-holder which can be opened up entirely, so as to facilitate thorough cleaning and removal of lather, &c.

A further object of our invention is to provide means for readily adjusting the angle of the handle of the holder in relation to said holder, so as to suit the convenience or tastes of each individual user.

In the accompanying drawings, forming a part of this specification and in which like letters of reference indicate like parts in all the views, Figure 1 is a plan view of our improved safety-razor and the blade thereon, parts of the blade being broken away. Fig. 2 is an end view of the same, parts being broken away and others shown in section. Fig. 3 is a plan view of a modified construction of the safety-razor and of the blade, parts of the latter being broken away. Fig. 4 is an end view of the construction shown in Fig. 3, parts being broken away and others shown in section. Fig. 5 is a sectional view through the handle, looking upward of Fig. 2. Figs. 6, 7, and 8 are end views in diagram of our improved safety-razor, showing the different positions in relation to the holder of blades of different widths. Fig. 9 is a plan view of another modification of our safety-razor, parts being broken away. Fig. 10 is a side view of the upper part of the construction shown in Fig. 9. Fig. 11 is a plan view of a further modification, parts being broken away. Fig. 12 is an end view of the upper part of the construction shown in Fig. 11. Fig. 13 is an end view of a further modification of the holder, showing the same closed. Fig. 14 is an end view of the same construction opened. Fig. 15 is an end view of a further modification closed. Fig. 16 is a view of the same construction opened. Fig. 17 is a plan view of the construction shown in Figs. 13 and 14 closed. Fig. 18 is a plan view of the construction shown in Figs. 15 and 16 closed. Fig. 19 is a diagram view showing blades of different concavity.

The blade-holder has a body or shell A, made of sheet metal, U-shaped in cross-section and open at the top and provided at the top with the two end pieces B, which are curved convexly in such a manner that the under side of the hollow-ground blade C can rest snugly on them, as shown in the drawings. The end cross-pieces B may be made integral with the shell or body, as shown in Figs. 1 to 4, or they may be hinged to the same, as shown in Figs. 13 to 18.

The holder is provided with a hinged or swinging top D, which, as shown in Figs. 1 to 4, is hinged to the back of the casing or holder A to swing upward, or it may be hinged to a frame D', hinged to the casing, as shown in Figs. 13 and 14. The hinged top D is provided with side lugs E, which rest upon screws F' or like adjustable supports in angle-lugs F, extending downward and inward from the end cross-pieces B and by means of which the hinged top D can be readily adjusted higher or lower, as necessity may require.

A guard G, having downwardly-extending teeth G', is formed on the free front edge of the top D, and it is essential for the perfect operation of the razor that such teeth shall be directly below the cutting edge of the blade C and slightly in advance of the same a certain predetermined distance, so that the edge of the blade cannot cut into the skin and yet can cut the hairs off close to the skin, so as to give a close and clean shave. The blade C is pressed in the direction toward the guard by a spring H, riveted to the casing or shell A and resting against the back of the blade. Heretofore we provided the shell with lugs or arms which projected over the blade and in which lugs or arms screws were held, against the lower ends of which the upper surface of the blade was pressed by the spring H, and this spring, with the screws, thus determined the position of the cutting edge of the blade in regard to the guard. It is evident that when these screws were set for a blade of a certain width or concavity they would not be in proper position for a blade of another width or concavity. We therefore provide the hinged top D at each end with an extra arm J', from which a lug J extends upward, which lug is so arranged that when the cutting edge of the blade rests against it the blade will be in proper position in relation to the guard. To facilitate adjusting the said lug, we also make the same U-shaped with a longer free shank J², against which the edge of the blade rests, as shown in Figs. 3 and 4. With this construction the lug can be bent forward or backward, so as to adjust the same for the proper position for the blade. In order to hold the cutting edge of the blade down on the guard, we provide an upwardly-projecting lug K on the outer edge of each cross-piece B and on the upper ends of said lugs form spring-arms L, which rest upon the top of the blade and press the blade downward upon the cross-pieces B.

Figs. 1 to 4 show two slightly-modified forms of said spring-arms L.

Fig. 9 shows a longer arm and end lugs M on the cross-pieces for holding the blade in place.

Figs. 11 and 12 show a V-shaped spring-arm L', which has two bearing-points at l and l'.

The blade must always rest firmly and securely on the casing independently of the guard, but its edge must be in the proper position in relation to the guard. A stop-lug for the cutting edge on the casing would hence not produce the desired result, as the blade might be in proper position in regard to the casing, but would not be in proper position in regard to the guard. It is therefore essential that the stops J should be formed on the guard independent of the casing, but at the same time the pressure-springs L must be supported by the casing, upon the end cross-pieces of which the blade is pressed by said springs, so as to hold the blade firmly and securely, which is most essential.

Figure 19:
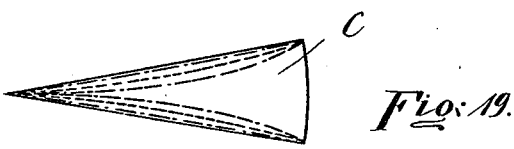

It is evident that a short blade C, as shown in Fig. 8, is pressed farther toward the front than a longer blade, as shown in Fig. 7, or a still longer blade, as shown in Fig. 6, and that the spring-arm L should at all times hold a long or a short blade down on the cross-pieces B, and thereby in proper position in relation to the guard. The same holds good as to blades of different concavity, as shown in Fig. 19.

As the grinding-stone wears off the concavity of the blades increases, and it would be too expensive to grind all blades to the same concavity. With the stop-lugs J and the spring-arms L a blade of any width and any concavity will fit properly on any holder or casing, and no adjustment is required except that of the hinged top D to the proper plane, which is the same for blades of any width or any concavity. It is also necessary to provide a spring-pressure from the under side on the blade when held in the holder, and for this purpose we provide the hinged top at each end near the back with a spring-arm N, which presses upward on the blade and facilitates holding the blade firm and true on the holder or casing.

Figure 15:
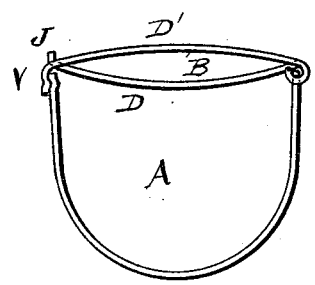
Figure 16:
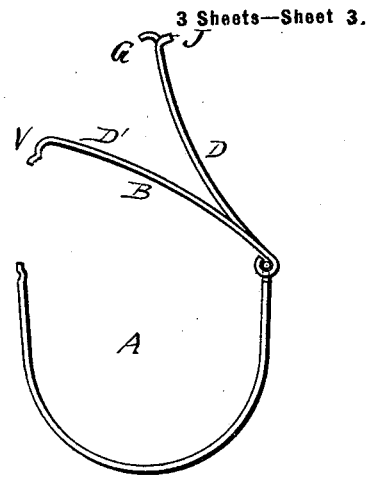
Figure 17:
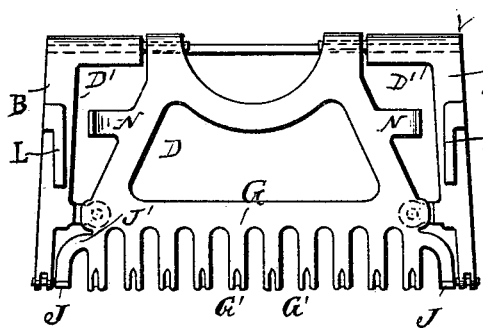
Figure 18:
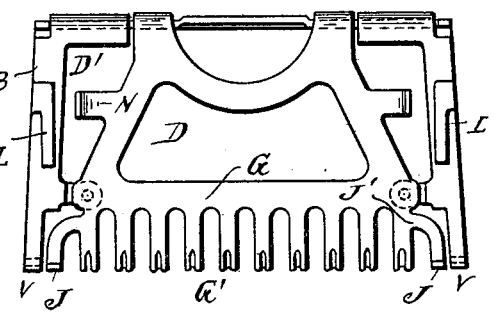

It is very desirable to have the entire top of the casing or holder open for the purpose of facilitating cleaning, and to this end we hinge the top D to a frame D', comprising the end cross-piece B and hinged to the back of the casing. When closed, the casing appears as in Fig. 13, and when opened up as in Fig. 14. When closed, the hinged frame D' locks on the casing by means of catches, and the hinged top D rests upon the said hinged frame. As shown in Figs. 15, 16, and 18, the top frame D' may be hinged to the back of the casing or holder A, and the hinged top D also hinged to the back of the casing or holder.

Usually the handles P are fixed to the casing or holder A at a certain angle, but different users prefer to have the handles at different angles to suit their convenience, especially when they desire to shave one side of the face with the razor held in the right hand and the other side of the face with the razor held in the left hand. For this purpose the screw-socket Q for receiving the screw R on the upper end of the handle P is not permanently secured in the casing, but is attached to a separate piece S, curved to rest snugly on the casing and mounted to slide on the same transversely to the length of the casing by means of headed pins T, which are secured in the casing and pass through longitudinal slots T' in the slide S.

The sliding piece S may be mounted on the outside of the casing, as shown in Fig. 2, and in that construction the casing has a slot W for receiving the end of the screw R.

When the sliding piece S is mounted on the inside of the casing A, as in Fig. 4, the casing A must also be provided with the slot W', through which the screw R passes.

Having described our invention, what we claim as new, and desire to secure by Letters Patent, is—

1. In a safety-razor, the combination with a blade-holder, of a hinged top having a guard, stop-lugs for the edge of the blade at the ends of the guard, spring-arms on the end parts of the holder for pressing the blade downward and a spring for pressing the blade against the stop-lugs, substantially as herein shown and described.

2. In a safety-razor, the combination with a blade-holder, of a hinged top having a guard on its free edge, a U-shaped stop-lug on each end of the guard, springs on the end parts of the holder for pressing the blade downward and a spring for pressing the blade against the stop-lugs, substantially as herein shown and described.

3. In a safety-razor, a guard having U-shaped stop-lugs for the edge of the blade at the ends of the guard, substantially as herein shown and described.

4. In a safety-razor, a guard having a U-shaped stop-lug at each end of the guard, the outer shank of said U-shaped stop-lug being longer than the inner shank, substantially as herein shown and described.

5. In a safety-razor, the combination with a blade-holder, of a hinged top on the same, a guard formed on the free end of said hinged top, an upwardly-extending spring-arm on each end of the hinged top near the rear edge, substantially as herein shown and described.

6. In a safety-razor, the combination with a blade-holder of a hinged top on the same, a lug extending upward from the end part of the holder and a spring-arm on each lug which spring-arms extend over the hinged top and are inclined downward toward the free edge of the hinged top and means for pressing a blade toward the guard, substantially as herein shown and described.

7. In a safety-razor, the combination with a blade-holder, of a guard, a lug extending upward from each end part of the holder and a V-shaped spring-arm on each lug, and means for pressing the blade toward the guard, substantially as herein shown and described.

8. In a safety-razor, the combination with a blade-holder, of a hinged top in the same, provided with a guard, an upwardly-extending lug N on each end part of the holder, an additional upwardly-extending lug on each end part of the holder, spring-arms on said additional lug and means for pressing the blade toward the guard, substantially as herein shown and described.

9. In a safety-razor, a blade-holder having a U-shaped body, a top frame hinged to the said body and a hinged top provided with a guard substantially as herein shown and described.

10. In a safety-razor, the combination with a blade-holder having a U-shaped body, a top frame hinged to said body, and provided at its ends with upwardly-extending lugs having spring-arms for exerting a downward pressure on the blade and a hinged top having a guard, substantially as herein shown and described.

11. In a safety-razor, the combination with a blade-holder and guard, of a plate mounted to slide on said holder and a handle attached to said sliding plate, substantially as herein shown and described.

12. In a safety-razor, the combination with a blade-holder and guard, of a sliding plate mounted on the holder and provided with a screw-socket and a handle screwed into said socket, substantially as herein shown and described.

In testimony that we claim the foregoing as our invention we have signed our names, in presence of two witnesses, this 11th day of March, 1898.

FREDERICK KAMPFE.
RICHARD KAMPFE.
OTTO KAMPFE.

Witnesses:
N. M. FLANNERY,
OSCAR F. GUNZ.